(12) United States Patent
Kern et al.

(10) Patent No.: US 10,769,183 B2
(45) Date of Patent: Sep. 8, 2020

(54) IDENTIFYING RESOURCES IN USER INTERFACES FOR FEEDBACK

(71) Applicant: Microsoft Technology Licensing, LLC, Redmond, WA (US)

(72) Inventors: David A. Kern, Kirkland, WA (US); Elliot N. Munger, Carnation, WA (US); Jared M. Green, Carnation, WA (US); Sven Merget, Redmond, WA (US); Bill L. Smith, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 316 days.

(21) Appl. No.: 15/632,395

(22) Filed: Jun. 26, 2017

(65) Prior Publication Data
US 2018/0322129 A1 Nov. 8, 2018

Related U.S. Application Data

(60) Provisional application No. 62/502,583, filed on May 5, 2017.

(51) Int. Cl.
| | |
|---|---|
| *G06F 3/048* | (2013.01) |
| *G06F 16/242* | (2019.01) |
| *G06F 3/0481* | (2013.01) |
| *G06F 16/17* | (2019.01) |
| *G06F 16/14* | (2019.01) |
| *G06F 9/451* | (2018.01) |

(Continued)

(52) U.S. Cl.
CPC .......... *G06F 16/3322* (2019.01); *G06F 3/048* (2013.01); *G06F 3/0481* (2013.01); *G06F 9/454* (2018.02); *G06F 16/144* (2019.01); *G06F 16/1734* (2019.01); *G06F 16/2425* (2019.01); *G06F 16/951* (2019.01)

(58) Field of Classification Search
CPC .... G06F 16/144; G06F 16/1734; G06F 3/048; G06F 3/0481; G06F 9/454
See application file for complete search history.

(56) References Cited

U.S. PATENT DOCUMENTS

| | | | |
|---|---|---|---|
| 7,756,895 B1 * | 7/2010 | Emigh | G06Q 10/109 707/784 |
| 9,417,984 B1 | 8/2016 | Drury et al. | |

(Continued)

*Primary Examiner* — Marc S Somers

(57) ABSTRACT

Embodiments relate to enabling users to provide feedback on resources displayed in user interfaces. A feedback tool is executed to allow a user to specify a resource displayed in a user interface. Context metadata about the user interface is captured and stored by the feedback tool. The context metadata corresponds to runtime activity such as loading executable modules, rendering the user interface, handling windowing/input events, etc. The tool is used to specify a resource displayed in the user interface. This triggers capture of the specified resource and the runtime context metadata. The resource and context metadata are searched for in a database of known resources and their respective properties and identifiers. If a match is found, then the source-level identity of the resource is known. The feedback is associated with the resource and used to directly supplement or modify the resource in a source code resource file.

17 Claims, 6 Drawing Sheets

(51) Int. Cl.
    *G06F 16/332*    (2019.01)
    *G06F 16/951*    (2019.01)

(56) References Cited

U.S. PATENT DOCUMENTS

| | | | |
|---|---|---|---|
| 2005/0114329 A1* | 5/2005 | Dettinger | G06F 16/90332 |
| 2007/0226201 A1* | 9/2007 | Lerum | G06F 11/0775 |
| 2007/0244691 A1* | 10/2007 | Alwan | G06F 17/2276 |
| | | | 704/8 |
| 2008/0133216 A1* | 6/2008 | Togami | G06F 9/454 |
| | | | 704/4 |
| 2008/0250331 A1* | 10/2008 | Tulshibagwale | G06Q 10/10 |
| | | | 715/751 |
| 2010/0318743 A1* | 12/2010 | Fitzpatrick | G06F 9/454 |
| | | | 711/126 |
| 2011/0144972 A1 | 6/2011 | Koenig | |
| 2013/0227516 A1 | 8/2013 | Kriegsman | |
| 2014/0201643 A1* | 7/2014 | Brisebois | G06F 8/38 |
| | | | 715/738 |
| 2015/0052427 A1* | 2/2015 | Vagell | G06F 17/24 |
| | | | 715/256 |
| 2015/0161160 A1* | 6/2015 | Chen | G06F 9/454 |
| | | | 707/639 |
| 2015/0180911 A1* | 6/2015 | Mavinakuli | H04L 41/0273 |
| | | | 715/234 |
| 2016/0283204 A1* | 9/2016 | Zaiwei | G06F 9/454 |
| 2016/0350108 A1 | 12/2016 | Joo | |
| 2016/0357519 A1 | 12/2016 | Vargas | |
| 2017/0104840 A1 | 4/2017 | Spagnola et al. | |

\* cited by examiner

IDENTIFYING RESOURCES IN USER INTERFACES FOR FEEDBACK

RELATED APPLICATION

This application claims an invention which was disclosed in Provisional Application No. 62/502,583, filed May 5, 2017, entitled "IDENTIFYING RESOURCES IN USER INTERFACES FOR FEEDBACK". The benefit under 35 USC § 119(e) of the United States provisional application is hereby claimed, and the aforementioned application is hereby incorporated herein by reference.

BACKGROUND

Complex software systems often include many source code resources that, through compilation, linking, and/or runtime actions, are loaded into memory and displayed in user interfaces. Typically, resources in a software project are isolated into resource files where resources are included and referenced or indexed by resource identifiers. The source code files in the software project include resources by referencing the necessary resource identifiers. For example, most user interface buttons have a label property. Source code might assign a resource identifier to a label of an instance of the button. The resource identifier may point to a localized resource string, e.g., "hello world". When the source code is compiled and executed, the button is displayed with the "hello world" label. Using this layer of indirection for resources, it is convenient to change the locale (or language) for the resources for a software project. Usually, the resource strings are resolved at runtime. For instance, if an environment variable specifies a locality or language, that variable is used at runtime to select the resource file that will be used to resolve the resource strings.

Large software projects such as operating systems or complex web applications may have thousands or even millions of resource strings. Maintaining so many resource strings, for instance correcting errors or updating for consistency, is burdensome. If a software project is to be provided for different languages or locales, each different locale or language requires its own set of resource string translations or versions. Consider that there are over 7,000 languages spoken in the world. Roughly 150 to 200 of the world's languages are spoken by at least one million people. Yet even well-funded software projects with many decades of development often support no more than a hundred languages or dialects. As can be seen from these numbers, most software projects lack resource support for languages spoken by significant numbers of people. The practical inaccessibility of many software products means that much potential human productivity is unrealized.

One approach to this problem has been to enable communities of users to build or revise the resources of projects. With this approach, a feedback system is designed to allow users to provide feedback in association with a resource. Typically, workflows for such feedback have been limited to basic functions such as receiving a feedback from a user (e.g., a proposed edit or translation) and associating the feedback with the relevant software project or a generic screen or topic of the relevant software. Developers, translators, or editors then review the feedback and make appropriate edits or additions to the resources of the software project.

The current approach for managing feedback has many shortcomings. To make use of a feedback, a person (reviewer) must go through several steps. The feedback itself must be reviewed for accuracy and relevance. To review the feedback, and to apply it to a resource file, the reviewer must understand the context of the resource to which the feedback is directed. This may involve manual steps of tracking down the resource in source code, running the relevant software, using available clues to locate the resource. This alone can take significant time, even if the relevant user interface screen or application has been identified. Review of feedback such as a proposed resource addition or edit may involve verifying a proposed language translation or evaluating the propriety of a proposed change. This human involvement is costly and can slow down the time that it takes for feedback to be incorporated into a software project.

Techniques related to facilitating feedback for resource strings are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to enabling users to provide feedback on resources displayed in user interfaces when the source-level identity of the resources is unknown during runtime. A feedback tool is executed to allow a user to specify any arbitrary resource displayed in a user interface. When the feedback tool is activated, context metadata about the user interface is captured and stored. The context metadata corresponds to runtime activity such as loading executable modules, rendering the user interface, handling windowing/input events, and the like. The feedback tool is independent of the user interface and is used to specify a resource displayed in the user interface. Specifying or selecting a resource for feedback triggers capture of the specified resource and the relevant runtime context metadata. The resource and context metadata are used as query parameters to query a database of known resources and their respective properties and identifiers. If a match is found, then the source-level identity of the resource is known. The feedback is then associated with the resource and can be used to directly modify, replace, or add to the resource (for instance in a new language/locale). A community of users using the feedback tool may collectively maintain resource files or create new resource files for new language support.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
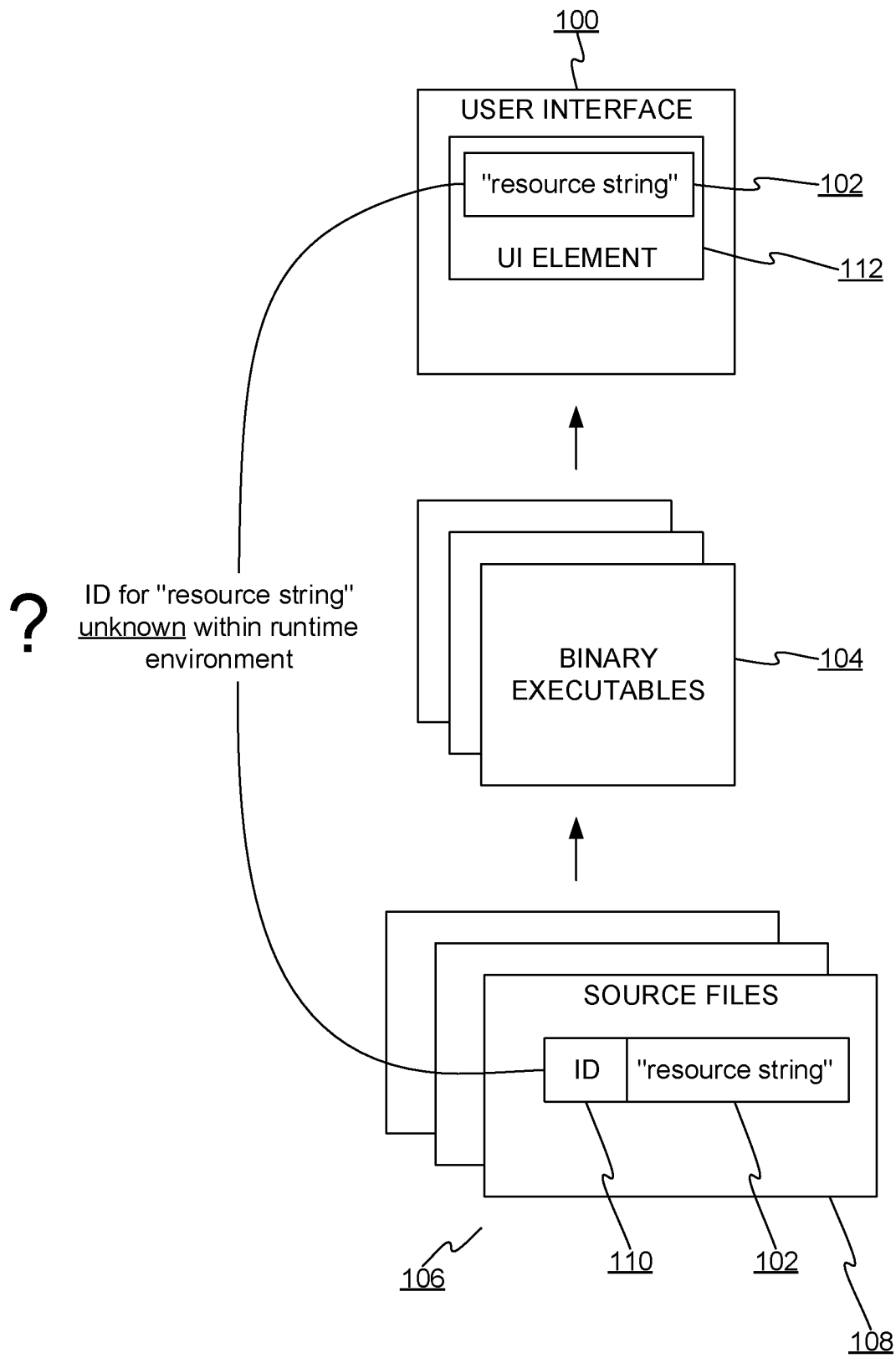
FIG. 1 shows how a user interface can display a resource without having information sufficient to identify the resource with the particularity needed for updating the resource.

FIG. 1 shows how a user interface 100 can display a resource 102 without having information sufficient to identify the resource 102 with the particularity needed for updating the resource 102. The user interface 100 may be any type of graphical interface displayed by any type of software on any type of computing device. In one embodiment, the user interface 100 may be part of a stand-alone compiled application consisting of binary executable files 104, including perhaps dynamically linked libraries, directly executable files, etc. The executable files 104 are compiled from source files 106. The executable files 104 may be pre-compiled machine code, just-in-time compiled bytecode, or the like. The source files 106 may include programming language source code as well as resource files 108. As noted in the Background, a resource file 108 may associate resources with respective resource identifiers (resource IDs) 110. A source code file has source code instantiating the user interface 100 and referencing the resource ID 110 to assign the corresponding resource 102 to a user interface element 112. When the source code is compiled, the resource ID is embedded in an executable file 104. When the executable file is executed, the runtime environment reads the resource ID, accesses the corresponding resource file 108, obtains the resource 102 per the resource ID, and displays the resource 102 in the user interface element 112.

This simple example illustrates the general approach of using an indirection layer to allow resources to be conveniently incorporated into a software project. The details may vary with different programming languages and different runtime environments. For example, some compilers may embed referenced resources directly into compiled executable files 104. Some may have special sub-systems for building and executing user interfaces. In most cases, there may be a complex chain of files and dependencies when a resource is referenced. Furthermore, in most cases it is difficult or impossible to tell, at runtime, where any particular resource may have been defined. That is, during execution of the software that displays the user interface 100, there is usually no information available that directly relates the resource 102 as displayed in the user interface element 112 to its definition or provenance in the resource file. Thus, if feedback about the resource or a new translation of the resource is submitted, additional instrumentation is needed to enable a resource identified by a user to be correlated, at the source code level, with feedback from the user.

Figure 2:
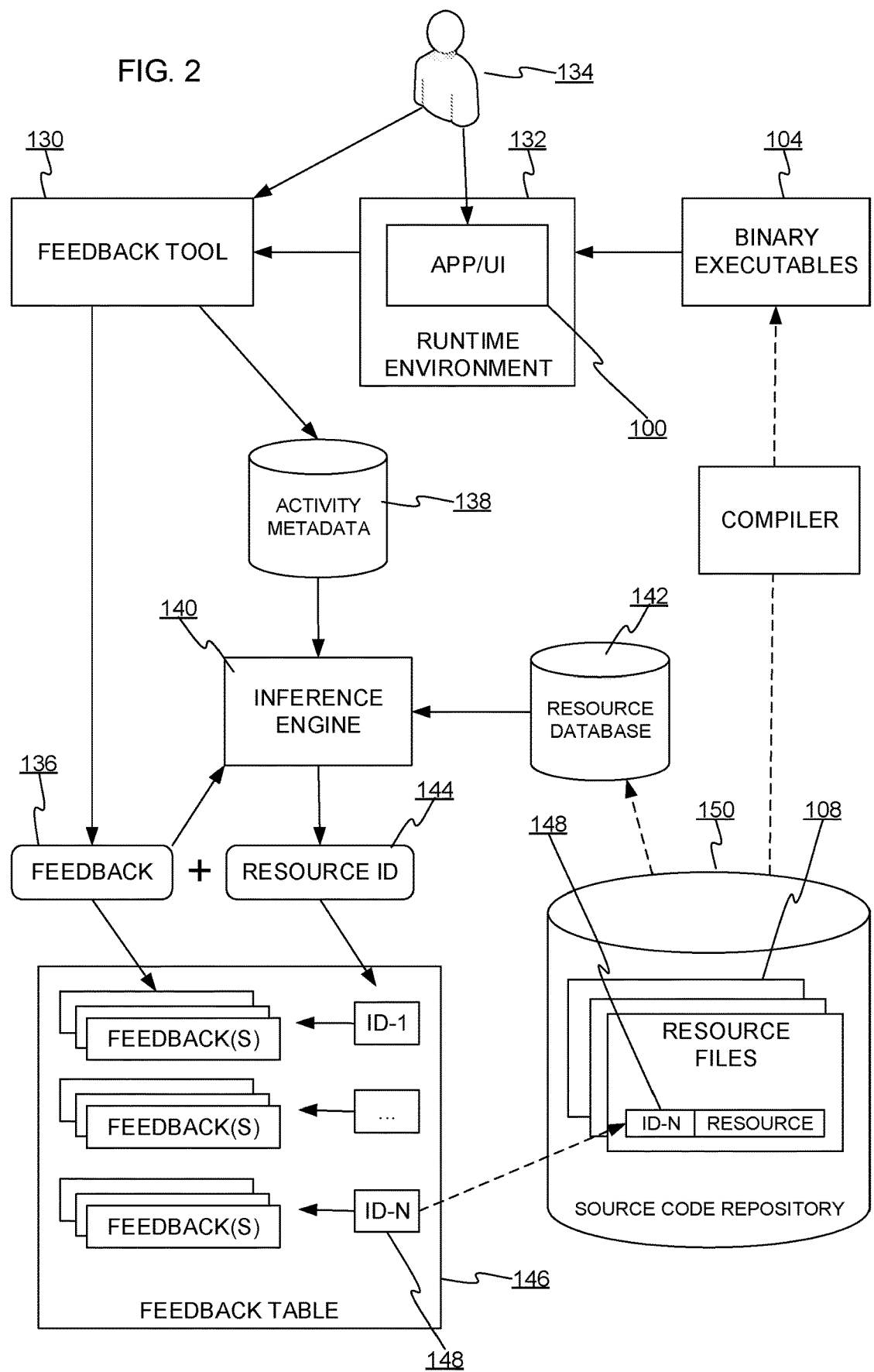
FIG. 2 shows how a feedback tool can be used to enable pinpoint identification of resources displayed in user interfaces.

FIG. 2 shows how a feedback tool 130 can be used to enable pinpoint identification of resources displayed in user interfaces. A runtime environment 132 executes binary executables 104. The runtime environment 132 may be a managed environment such as a Java™ virtual machine, an operating system (with a loader, linker, etc.), or any other known system for managing the loading and execution of compiled code. The runtime environment executes an application that displays the user interface 100. Either before the application starts executing, or during execution of the application, the feedback tool 130 is started. In one embodiment, the feedback tool 130 is a distinct application started manually by the user 134. The feedback tool 130 is designed to be able to work with any arbitrary code or application that executes on the computing device and displays a user interface. The feedback tool 130 need not have any information about any resource strings that will be displayed or potentially selected for feedback.

Conceptually, the feedback tool 130 may be thought of as interactive instrumentation layered on top of the user interface 100. In one embodiment, the feedback tool 130 is part of the event-handling chain and may intercept input events, handle them, and also allow the events to pass on to the underlying user interface. The feedback tool 130 may have a toolbar, pop-up menu, or other controls to enable the user 134 to control the behavior of the feedback tool 130. For example, start/stop buttons may activate or deactivate the feedback tool 130. While active, the feedback tool 130 includes a mechanism to enable the user to manually select or target a displayed resource. While the feedback tool 130 is active, a resource may be targeted by directing a pointer input to a resource, by hovering a pointer over a resource, clicking the resource, activating a control of the feedback tool 130, etc. Interactive selection of a resource displayed while the feedback tool 130 is active also triggers display of a feedback input control (e.g., a text control) into which user feedback 136 may be inputted. In one embodiment, properties of the feedback may also be inputted. For example, if the feedback is a proposed translation of a resource string, the feedback tool 130 may include an interactive control to set the language of the feedback.

The feedback tool 130 also captures context metadata 138. As discussed above, in many runtime environments, resources are loaded during execution without the ready availability of the source-level references used to compile the code that uses resources. Therefore, to enable identification of a resource in terms of its source code (or resource file) and hence revision, augmentation, or extension of the resource, context metadata is captured during execution and then used to infer the identity of the resource.

The captured context metadata may include some of the following types of information. The process name of the process displaying the resource may be captured. A current culture environment variable may also be read and stored. In some cases, user interface instrumentation may be available to capture UI automation identifiers or the like. Bounding boxes and screen coordinates may also be stored. Some systems may even enable full reconstruction of the hierarchy of user interface elements in the target user interface. Resource paths, if supported, may be acquired. Names and locations of files loaded in association with the target application or user interface may be captured. File dependencies may be included. In some embodiments, context capture is in a constant-on state where context is continually captured when the tool is running, for instance in a circular buffer, and is persisted when there is an indication that feedback is to be provided. A list of modules loaded, assembly version, and the like may also be stored. Configuration settings, registry settings, and other system data is also potentially helpful for inferring a resource's underlying identity. Some runtime environments and/or compiled code may include features designed for accessibility which can also be leveraged. Significantly, the context metadata 138 also includes the actual resource targeted for feedback. Also, a screenshot of the display or user interface is captured and stored.

At least some of the context metadata 138 is fed to an inference engine 140 (when the feedback is captured, or later). As will be described with reference to FIG. 3, the inference engine accesses a resource database 142 containing pre-accumulated static information about resources used for the relevant software subject to feedback. Preferably, the resource database 142 contains as many of the same pieces of metadata as potentially captured by the feedback tool 130 into the context metadata 138. Briefly, the inference engine 140 performs a query of the resource database 142 to find any resources matching the captured resource and also having associated resource metadata that matches the captured context metadata. Ideally, this will identify a single resource. The resource database 142 also includes a universal resource identifier (URI) for each known resource. The URIs form a namespace within which all potential resources (including for different applications/executables) have respective unique identifiers. The resource database 142 may also have the resource IDs used in the relevant source code projects to identify resources. Put another way, the resource database 142 includes: information for identifying resources from context information, globally unique identifiers for resources that may be used by the feedback tool 130 (and by other components described later), as well as project or source code resource IDs that allow a resource to be linked to the source code file or resource file in which the resource is defined and/or referenced.

If the inference engine 140 finds a match for the targeted resource, the URI 144 (or a sufficiently qualified resource ID) is outputted and stored in a feedback table 146. The feedback table 146 stores the URIs 148 of resources targeted for feedback in a one-to-many relationship with each item of feedback, feedback properties (e.g., language), the screenshot (if taken) and any other information that might be relevant to feedback directed to resources. The feedback table 148 may also store references to persisted context metadata for feedback for which the inference engine 140 is unable to resolve unique resource identifiers.

The resource database 142 and the feedback table 148 may be functionally linked to a code database or code repository 150. The code repository may store the source code files 106, including resource files 108. Code repository 150 may store source and resource files for any of the software potentially targeted by the feedback tool 130. The code repository 150 (or the feedback table 146) may store a map between URIs and the resource IDs in resource files so that global URIs may be mapped to specific resource IDs in specific resource files. In one embodiment, URIs may be implemented as a concatenation of the code-level resource ID, plus a file name/path, and/or a project name, or other attributes that together can globally uniquely identify resources.

The code repository 150 is also functionally linked to the resource database 142. Specifically, the resource database 142 is populated with resources and respectively corresponding source metadata from the code repository 150. That is, properties of the resources are obtained from the source code files, project files, revision control system, and similar sources, and stored in association with the resources. As shown in FIG. 2, there is a feedback loop from the resource files in the code repository, to the binary executables 104 running the user interface 100 displaying resources, to the feedback tool 130, and back to the resource files in the code repository 150.

Figure 3:
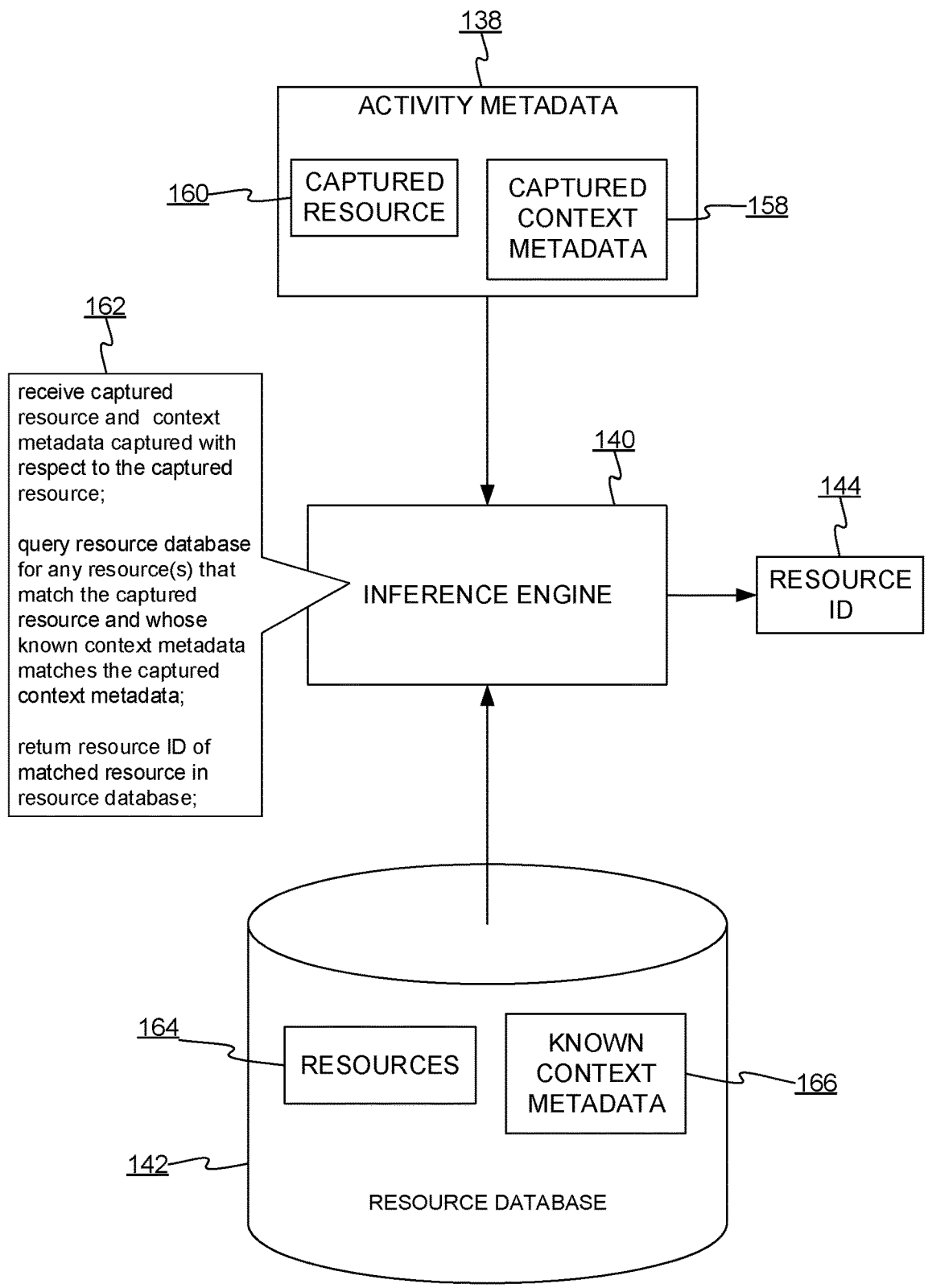
FIG. 3 shows details of an inference engine.

FIG. 3 shows additional details of the inference engine 140. As discussed above, the context metadata 138 is captured by the feedback tool during execution of a target user interface. The feedback tool, based on user input, captured runtime data 158 during loading and execution of compiled code. For instance, file names/paths, module names, revision numbers, language/locale settings, windowing events, and other datum mentioned above. In some embodiments, the feedback tool and/or the inference engine 140 may construct a model of the user interface, building a representation of the objects (and their properties) of the target user interface, the screen geometry of the user interface, and the like. The inference engine 140 performs a process 162 to attempt to resolve the captured resource 160 and the captured runtime data 158.

The inference engine 140 receives the captured resource and runtime context data, and optionally any model or reconstruction of the user interface. The inference engine 140 builds a query specifying the captured resource and accompanying properties or context that are determined to be specific to the resource. The inference engine 140 then performs the query against the resource database 142. If a single resource matches the query then the resource is presumed to be the same resource queried for. An identifier of the resource is outputted, including perhaps a URI (which may be generated for the resource if one does not already exist), is outputted. The output of the inference engine 140 may go to the feedback tool, which in turn stores the feedback, resource identity, etc. In another embodiment, the inference engine 140 stores its output to the feedback table 146.

The embodiments described above may be performed on a single computing device storing the feedback tool, the executable components, the inference engine, the resource database, and the feedback table. The locally-implemented embodiments may also store resource files. The feedback inputting, resource identifying, and the storing of feedback in association with resources is executed in the context of the local operating system. The feedback may even be incorporated into new or existing resource files and hence become available locally in the binary executables and the corresponding user interfaces. Even if the user or the runtime environment does not know the precise identify of feedback-targeted resources, the resources may be identified and supplemented, replaced, added (perhaps for different localizations or languages), and so forth. As described next, network-based embodiments may enable feedback to be provided and managed in a communal fashion, which may provide various other advantages.

Figure 4:
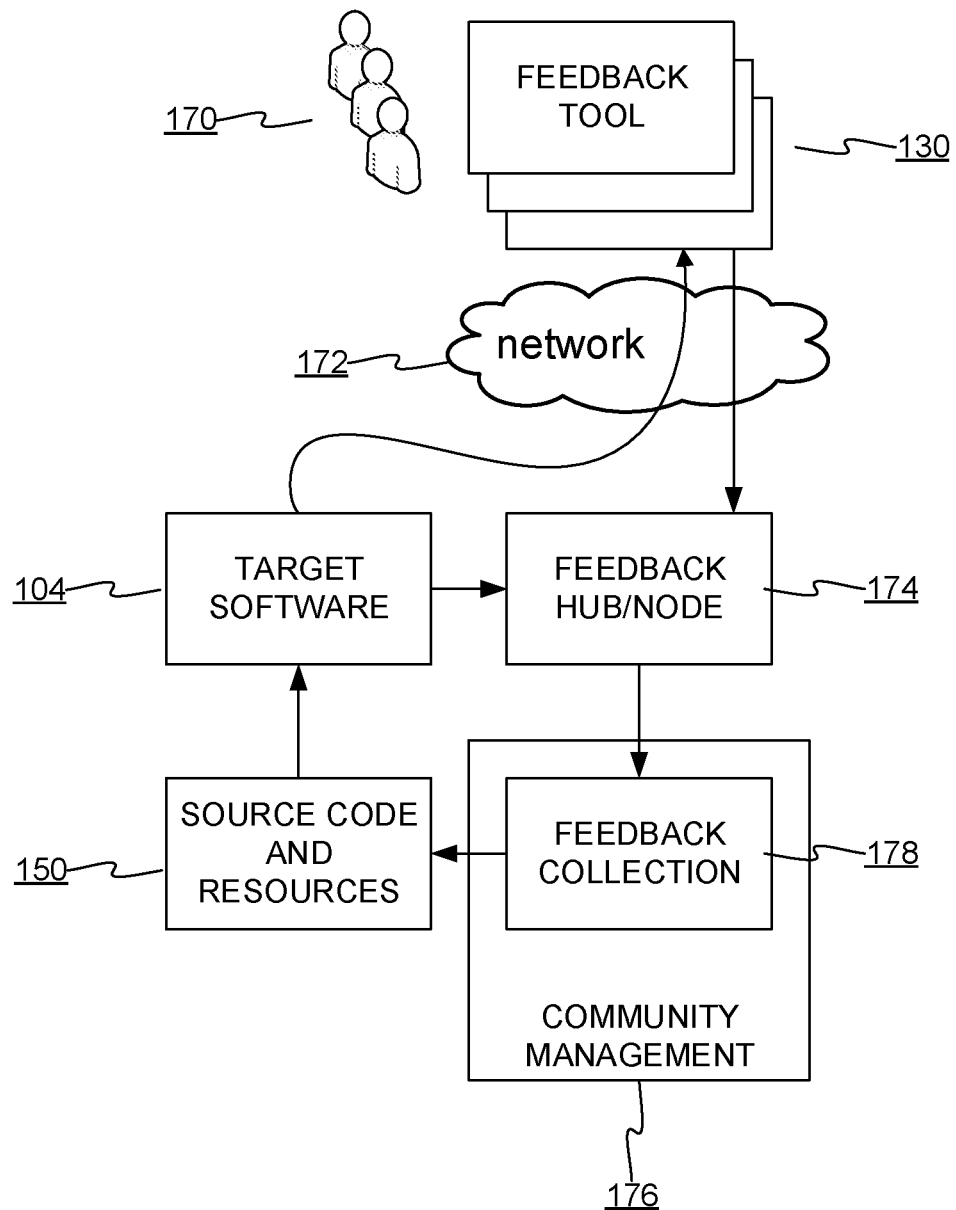
FIG. 4 shows a network-based feedback system for enabling communities of participants to provide feedback via a network to software projects.

FIG. 4 shows a network-based feedback system for enabling communities of participants 170 to provide feedback via a network 172 to software projects. The components involved are functionally similar to those described above. Feedback inputting and resource context capturing is performed on local devices operated by the users, but the feedback is passed back through the network 172 to a feedback hub 174, which may be a website, a network service, or similar network-based application-level software executing on one or more server devices.

The feedback hub 174 may interface with a community management module 176 that manages user identities for the participants 170. The community management module 176 may manage login credentials (or using third-party credentials), maintain authorization levels of the user identities, store user profiles, manage user groups, and the like. The feedback hub 174 receives feedback data from the participant devices, for example, copies of the local feedback tables, but at the least, indicia of feedback-targeted resources, the feedback itself, etc. In one embodiment resource context is passed back to the feedback hub 174 and the feedback hub 174 runs the inference engine to resolve the resource context metadata to specific source-level resources.

In some embodiments, user authorization levels may be used to determine how feedback from participants is handled. For example, low-authorization users may be permitted to submit feedback and the feedback is stored for later review and perhaps approval/denial by privileged users/reviewers. Medium-authorization users may be permitted to submit feedback that is applied to resource files under limited conditions (e.g., for resources in languages that the users are approved for). High-authorization users may be permitted to submit feedback for any resource and the feedback is applied to the relevant source code. Different users may have different authorization levels within different user groups. In one embodiment all users are permitted to make local resource changes that are used only locally, and their feedback (resource changes) are forwarded for collection and possible community incorporation.

As can be seen, this approach enables the community to control the resource content of the relevant distributed executable user interfaces being locally executed. A feedback collection module 178 collects feedback from users and groups the feedback by software project or application, localization (language), and so forth. The community may even be permitted to initiate new resource files for new languages or locales. Thus, in cases of "orphan" languages with too few speakers to justify paid large-scale translations of complex resource sets, the community of speakers of that language may collectively build, maintain, and use their own localized resources. If the executables load resources at runtime per a localization setting (i.e., if resources are not copied into compiler outputs), then the relevant executables need not be modified. The community may continue to use the same software and begin using their new resources with re-building the software. The publisher or developer of the software need not do any more than provide or subscribe to supporting infrastructure to enable use of the feedback tool and the feedback hub.

A hybrid local-community design may also be used by combining the local and community elements. The feedback tool and target software execute on a local device, capture feedback and context, locally infer resource identities, and locally update or supplement resource files. The local device also has a community component that sends the locally accumulated feedback, context metadata, etc. to a backend service. The backend service collects the feedback and metadata from many such user devices and may combine them into communal updates as per the community-based embodiment described above.

The resource ID metadata captured at runtime can be leveraged to provide translation recommendations for the same string resource provided by other members within a user community. The users are presented with these recommendations in a language-community application which includes a user interface enabling the users to vote on their preferred recommendations. An elected recommendation can be automatically rolled into the appropriate resource files. The language-community application can also serve as a channel to provide a response to an end user who submitted a feedback. The resource ID mapping system provides a means to track the state of the user's feedback all the way through a resolution of the feedback. The resource ID associated with each feedback item is used to query the feedback processing infrastructure and inform users about the review and implementation state of their feedback. The status of their feedback is provided back to the user through the language community application. The language-community application and the feedback tool 130 may be different screens/tabs of a same program, and the program may be web-based or locally installed.

Figure 5:
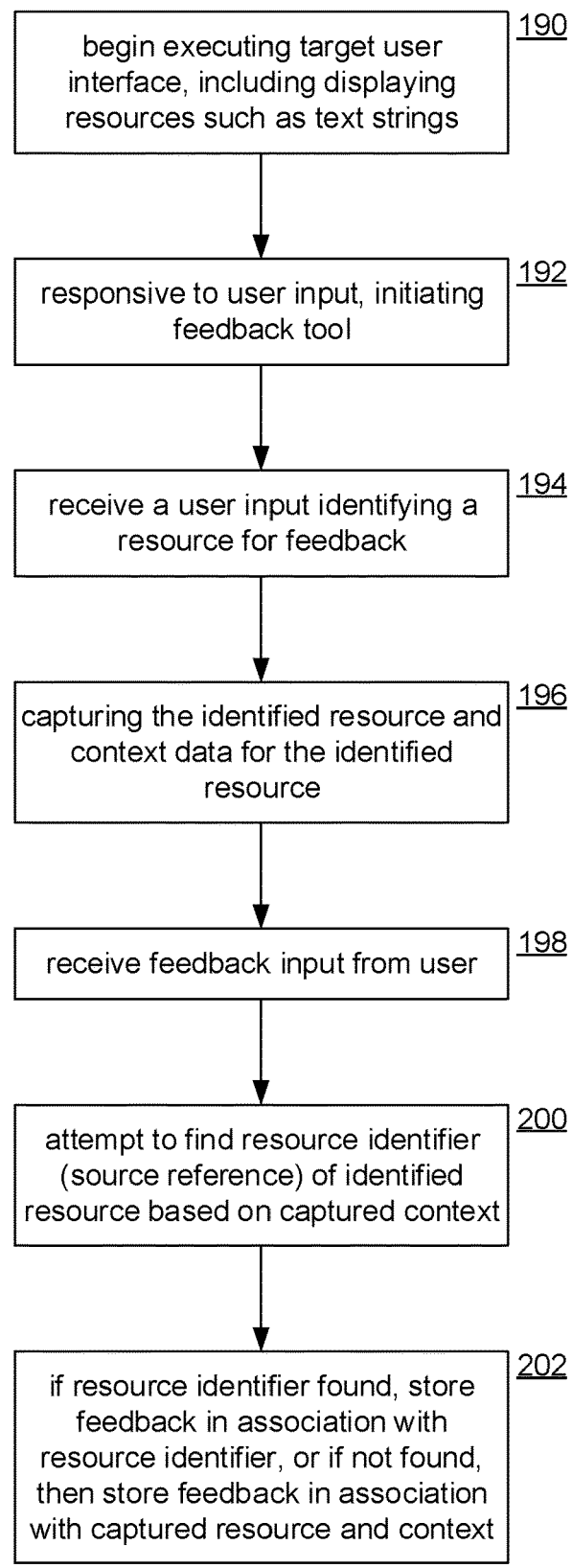
FIG. 5 shows a process for providing resource feedback.

FIG. 5 shows a process for providing resource feedback. The process may involve any combination of local and/or central actions as described above. As step 190 a user begins executing a user interface on their local device. The user interface display resources such as strings (note that other forms of resources besides text may be used; images, audio, and/or video resources may be rendered by the user interface). At step 192, user input instructs the feedback tool that feedback is to be inputted. The feedback tool captures context data that may be useful for identifying the sources of the displayed resources. At step 194 user input is directed to a resource to identify the resource as a feedback target. Because the feedback tool is active, the user input is passed to the feedback tool rather than the user interface. At step 196 the feedback tool uses the input to identify the targeted resource and to store context metadata in association with a copy of the targeted resource. At step 198 the user uses the feedback tool to input feedback in association with the targeted resource, for instance, typing a new or updated translation, providing a comment, or other text. At step 200 the inference engine attempts to find the identity of the resource in its store of known resources (built from or comprised of resource files). Some of the context metadata may also be stored with the feedback (e.g., a screenshot of the user interface). At step 202, if the target resource is inferentially resolved/identified, then the feedback is stored in association with the source-level identity of the resource. If the target resource is not identified then the feedback is stored in association with some or all of the captured context metadata and is available for human review.

In one embodiment, feedback that has been submitted for successfully identified resources is posted on the feedback hub for community review and may be approved or disapproved by a vote or a sufficiently privileged participant.

If the user interface is executed from declarative code then the declarative code may be analyzed to help reconstruct the original resource string. That is, if a resource string has been formatted, combined with other strings, and so forth, the string formatting code in the declarative code may be analyzed to help map the displayed text to the original resource string.

Figure 6:
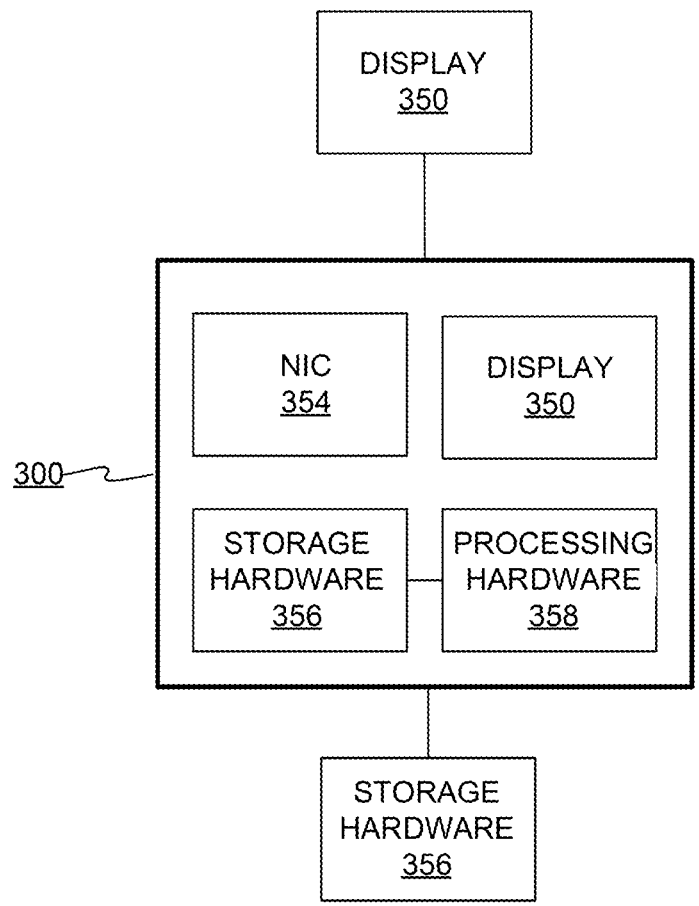
FIG. 6 shows details of a computing device on which embodiments described above may be implemented.

FIG. 6 shows details of a computing device 300 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 to implement any of the features or embodiments described herein.

The computing device 300 may have one or more displays 350, a network interface 354 (or several), as well as storage hardware 356 and processing hardware 358, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 356 may be any combination of magnetic storage, static memory, volatile memory, non-volatile memory, optically or magnetically readable matter, etc. The meaning of the terms "storage" and "storage hardware", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 300 may have any form-factor or may be used in any type of encompassing device. The computing device 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 358. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method implemented by one or more computing devices including user devices, the method comprising:
providing a feedback tool comprising an executable program configured to execute on the user devices, the user devices having one or more instances of target applications comprising respective user interfaces to display resource strings, wherein code of the target applications comprises working resource identifiers that identify the resource strings in resource files on the user devices, wherein, when the target applications are executed, resource files supply the resource strings to the target applications according to the working resource identifiers, and wherein the feedback tool is not one of the target applications;
executing instances of the feedback tool on the respective user devices, wherein the feedback tool, when executed on a user device, comprises a feedback function activatable responsive to user input;
responding to a first user input activating the feedback function in association with a resource string displayed in a user interface of a target application by automatically capturing:
a feedback string inputted by the user;
context metadata captured by monitoring a runtime execution environment, the context metadata corresponding to actions of the runtime execution environment that are performed to execute the target application; and
the resource string displayed in the user interface;
storing the captured resource string in association with the automatically captured context metadata and feedback string; and
receiving the association of the captured resource string, captured context metadata, and captured feedback string at a service via a network, and based thereon, searching, by the service, a database of the resource strings of the target applications and corresponding resource string metadata for the captured resource string and captured context metadata, wherein the searching finds a target resource string identifier, and wherein the resource strings and respective identifiers in the database are obtained from the resource files of the target applications; and
based on the found target resource string identifier, updating one of the resource files to include the feedback string, and distributing the updated resource file to the user devices.

2. A method according to claim 1, wherein the resource strings comprise translations, and wherein the captured feedback string comprises a candidate translation associated with the found target resource string identifier.

3. A method according to claim 1, wherein the captured resource string is loaded for display in a user interface based (i) the presence of the resource identifier in one of the one or more executable files and (ii) the presence of the resource string in one of the resource files.

4. A method according to claim 1, further comprising, based on the first user input directed to the feedback tool, automatically capturing at least a partial screenshot, and automatically storing the screenshot in association with the captured feedback string.

5. A method according to claim 1, further comprising determining an authorization level of a user identity of a user that inputted the feedback string, and based on the authorization level automatically updating the one of the resource files to include the captured feedback string.

6. A method according to claim 1, further comprising receiving votes from the user devices directed to the captured feedback string, and based on the votes determining to automatically update the one of the resource files with the captured feedback string.

7. A method according to claim 1, wherein the context metadata comprises one or more of: a name of a file or module loaded to execute the user interface, a culture or locale or language setting, a window or input event, a process name or identifier, a version number, or a bounding box.

8. A computing device comprising:
processing hardware;
storage hardware storing an operating system, compiled applications comprised of code executable by the processing hardware, and an executable feedback tool;
an application comprising code to display a user interface comprised of resource strings;
the feedback tool comprising code configured to be executed by the processing hardware, the feedback tool, when executed, performing a process while the application is executing, the process comprising:
receiving an indication of a resource string selected from the displayed user interface;
receiving feedback inputted in association with selection of the resource string;
capturing and storing context metadata comprising information identifying the application and/or a process thereof;
sending the feedback, resource string, and context metadata via a network to a service, wherein the service infers a source code identity of the resource string by searching, based on the context metadata and the resource string, for the resource string in a data store comprising application metadata and resource strings, wherein the data store is prepared prior to execution of the application and the feedback tool by obtaining the resource strings from resource files of applications including the application; and
an application resource file corresponding to the application, the application resource file comprising the feedback, the feedback having been added to the resource file based on the service inferring the source code identity of the resource string.

9. A computing device according to claim 8, wherein the feedback tool comprises an executable program separate from the applications, wherein the feedback tool is configured to enable feedback to be directed to any resource strings displayed by the applications executing concurrently with the feedback tool, and wherein the data store of resource strings comprises identifiers of the respective resource strings and the inferred source code identity of the resource string comprises an identifier obtained from the data store.

10. A computing device according to claim 8, wherein the feedback tool comprises a feedback user interface configured to enable feedback to be enabled and disabled, and wherein the feedback tool comprises a feedback input component that enables text to be interactively inputted to the feedback tool and associated with a corresponding resource string to which the text is directed.

11. A computing device according to claim 8, wherein the feedback tool is configured to associate feedback with resource strings of any arbitrary applications that execute on the computing device.

12. A computing device according to claim 11, wherein the storage hardware stores a feedback relay component configured to send feedback and associations with respective resource strings via the network to the service, wherein the service that collects feedback from a plurality of instances of the feedback tool on respective user computing devices and automatically incorporates the feedback into resource files configured for use with versions of applications from which the resource strings were obtained.

13. A method performed by one or more computing devices, the method comprising:
receiving feedback items over a network from a plurality of devices executing respective instances of a feedback tool and one or more instances of target applications other than the feedback tool, each feedback item respectively comprising (i) a feedback string inputted by a user via an instance the feedback tool, (ii) a resource string selected via an instance of the feedback tool from an instance of a target application, and (iii) context metadata captured by an instance the feedback tool, each context metadata captured from a runtime environment managing execution of the feedback tool and one or more of the target applications, and each feedback item's feedback string being associated with the feedback item's resource string based on selection, by an instance of the feedback tool, of the resource string from a user interface displayed by the application;
accessing a data store comprised of:
strings obtained from resource files of software projects corresponding to the respective target applications,
resource identifiers respectively associated with the respective strings in the data store, and
software project metadata items respectively associated with the resource identifiers;
identifying associations between the feedback strings in the received feedback items and resource identifiers in the data store by matching the context metadata of the feedback items with the project metadata items in the data store;
based on the identified associations, updating the resource files of the software projects to include the feedback strings; and
distributing the updated resource files to the devices.

14. A method according to claim 13, wherein the context metadata comprises one or more of: a file name, a file path, a resource path, an environment variable, a bounding box, a process name, and a version number.

15. A method according to claim 13, wherein the feedback tool displays, responsive to an input corresponding to providing feedback for a specific displayed resource string, a user interface comprising: a control to receive text inputted for a feedback string, a control to set a property of a feedback item, a display area that displays the corresponding resource string.

16. A method according to claim 13, further comprising graphically highlighting a resource string or a display region thereof responsive to an interactive selection of the resource string or the display region.

17. A method according to claim 13, further comprising automatically incorporating the feedback strings into a resource file stored on the computing device, the resource file configured to provide resource strings to an application such that the application incorporates, at runtime, the resource strings from the resource file, wherein a resource string displayed by the application from the resource file corresponds to a resource string selected for feedback by the feedback tool.

* * * * *